United States Patent [19]
Hufford et al.

[11] 3,886,459
[45] May 27, 1975

[54] DIGITAL PULSE RATE RAMPING CIRCUITS

[75] Inventors: James H. Hufford, Lexington;
Daniel W. Kennedy, Boston, both of Mass.

[73] Assignee: USM Corporation, Boston, Mass.

[22] Filed: Aug. 7, 1973

[21] Appl. No.: 386,353

[52] U.S. Cl. ............... 328/34; 307/271; 318/415; 318/696; 328/44
[51] Int. Cl. ........................................ H03k 1/16
[58] Field of Search ......... 307/271; 328/44, 61, 34, 328/38; 318/685, 696, 415

[56] References Cited
UNITED STATES PATENTS
3,553,549  1/1971  Leenhouts .................. 318/696 X
3,624,517  11/1971  Kobayashi et al. ............. 328/44 X Primary Examiner—John Zazworsky
Attorney, Agent, or Firm—Ralph D. Gelling; Vincent A. White; Richard B. Megley

[57] ABSTRACT

A circuit for digitally ramping the pulse repetition rate of a train of pulses is particularly useful for accelerating a stepping motor to or from its operating feed. In one mode of operation, the pulse ramp is linearly proportional to the difference between the instantaneous and desired pulse rates. In another mode of operation, a minimum pulse rate is impressed on the output pulse train. Means responsive to excessive, high rate input pulses bypass a portion of the circuit for preventing circuit overload.

1 Claim, 4 Drawing Figures

DIGITAL PULSE RAMPING MODULE

3,886,459

DIGITAL PULSE RATE RAMPING CIRCUITS

BACKGROUND OF THE INVENTION

Many modern control devices modify a series or train of pulses from an input condition to a desired output condition. The pulses may be electrical or fluid while the modification to the pulses may involve any of the pulse parameters such as pulse width, pulse amplitude or pulse rate. This invention relates to a control for the repetition rate of a train of pulses.

One application for such a control circuit is in a numerical control system for providing a train of an appropriate number of pulses to a stepping motor. Stepping motors provide an increment of movement for each pulse received by the motor. Since the stepping motor responds to the number of pulses provided to the motor, no feedback from the motor to the control is required to indicate when the motor has responded as commanded by the control. The elimination of the elements required for such feedback permits numerical control systems less complex and costly than those with feedback elements. Accordingly, non-feedback or open loop numerical controls are an increasingly popular control technology.

However, as with any mechanical system, stepping motors cannot instantaneously accelerate from one speed to another. If a change in pulse repetition rate exceeds the capacity of a motor for responding to a change in pulse rate, the motor will fail to respond to some pulses thus losing sync with the number of pulses in the train. Such operation defeats the pulse responsive function of a stepping motor. In a numerical control system, for example, the control will then fail to properly position the motor.

A technique often employed to avoid changing a pulse repetition rate in excess of a stepping motor's capacity to respond to a change in pulse rate is to ramp or gradually increase or decrease the pulse repetition rate of a train of pulses. A variety of circuits for this purpose are known. For example, one such circuit is disclosed in copending U.S. patent application Ser. No. 278,742 filed Aug. 8, 1972. The circuit disclosed in this application deletes initial pulses from a train and adds pulses at the end of the train in pulse places corresponding to those from which initial pulses were deleted. Another circuit is disclosed in copending U.S. patent application Ser. No. 301,669 filed Oct. 27, 1972. This circuit modifies the pule repetition rate of initial and final pulses of a train by the product of inversely varying rate fractions controlled by a selected number of initial and final pulses of the train. The circuits disclosed in both of these applications are intended to optimize the performance of a stepping motor by substantially matching the change of pulse repetition rate to the capability of a stepping motor to respond to the change in pulse repetition rate.

Unfortunately, the capability of a stepping motor depends upon the torque of the motor which, in turn, is a function of the instantaneous motor speed. Accordingly, a motor moving at a slower speed can appropriately follow a different change in pulse repetition rate than the same motor operating at a higher speed. Thus, for example, where it is desired to match the performance of two or more stepping motors having different instantaneous speeds, the maximum change in pulse rate is necessarily limited to the lower of the capabilities of the two motors.

In addition, it is sometimes desirable to have a stepping motor accelerate in linear proportion to the desired change in pulse repetition rate. For example, a numerical control for performing an operation often called "contouring" in which two or more stepping motors position an element, for example along X, Y coordinate axes, where the path taken by the element from one position to another is important to the function of the control, it is necessary to coordinate the operation of these stepping motors. Each motor must then make the desired change in position in the same time as the other and in proportion to the movement of the other. The resulting proportional movement of the motors causes the element to move precisely along a straight line path between the initial and desired final positions. Of course, proportionality between the movement of the motors must also be maintained during acceleration of the motors if the proportionality of their coordinated operation is to be maintained. To maintain the proportionality of movement during acceleration of motors in such operations, the change in pulse repetition rate of each motor must be linearly proportional to the desired change in pulse repetition rate.

One known circuit for this purpose has a reversible or up-down counter which counts up for each input pulse of the circuit and down for each output pulse. The number of pulses instantaneously registered in the counter is converted from digital to analog form in a digital - analog converter and the resulting analog of the instantaneous pulse count used to control a variable frequency oscillator. Pulses from the variable frequency oscillator are transmitted to the motor and back to down-count the counter. The pulse repetition rate from the oscillator may be made linearly proportional to the analog signals from the converter which, of course, is linearly proportional to the instantaneous count in the counter. Thus, this circuit theoreticaly provides the desired linear proportionality between an instantaneous pulse rate and the difference between the desired and instantaneous pulse rates.

Unfortunately, both digital to analog converters and analog signal controlled oscillators are unstable in response to a variety of external conditions such as heat and age. Therefore, both elements of the circuit are difficult to maintain in the desired linear proportionality. Similarly, it is difficult to match the performance of one such circuit to that of another to maintain coordinated operation of more than one circuit as desired, for example, in driving two or more stepping motors in a contouring numerical control.

SUMMARY OF THE INVENTION

Accordingly, it is an object of the invention to provide a digital pulse rate ramping circuit having digitally accurate linear proportionality to a desired change in pulse repetition rate which, because of its accuracy, may be used in pairs to maintain desired proportionality between the pulse repetition rate of two trains of pulses.

To this end, the invention provides all digital devices for ramping a pulse repetition rate of a train of pulses. In one mode of operation, the pulse ramp is linearly proportional to the difference between the instantaneous and desired pulse rates at each instant in time. In another mode of operation, an additional digital device impresses a minimum pulse rate on the output pulse train to alternatively permit faster initial acceleration of the pulse rate. Still further digital devices are responsive to excessive, high rate input pulses to bypass a portion of the circuit for preventing circuit overload.

DESCRIPTION OF THE DRAWINGS

A preferred embodiment which is intended to be illustrative of and not a limitation on the invention will now be described with reference to drawings of the embodiment in which.

DESCRIPTION OF THE PREFERRED EMBODIMENT

Figure 1:
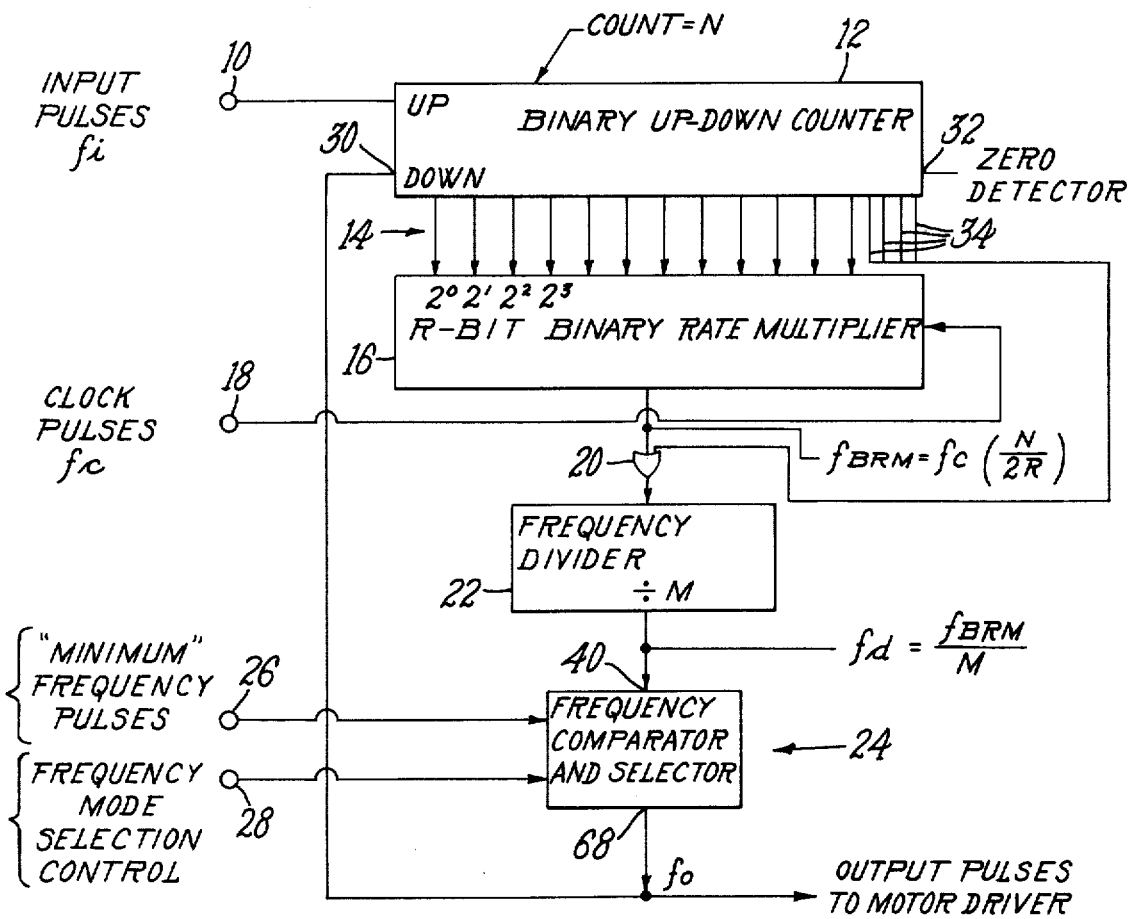
FIG. 1 is a schematic of the invention.

The preferred embodiment is intended to ramp a train of pulses for use in driving a stepping motor (not shown). The train of pulses to be ramped preferably has a finite number of pulses but has at least a first pulse at a different pulse repetition rate or frequency, including zero, at which the pulse ramping function occurs. The train of pulses is preferably provided by a numerical control in an open loop positioning system where the number of pulses in the train controls a desired movement of the stepping motor from one position to another.

The train of pulses to be ramped is provided to an up-counting port 10 of a reversible counter 12, for example, a commercially available binary up-down counter. The counter 12 may be a series of individual counter elements appropriately connected to provide a desired counting capacity. The desired counting capacity is a design parameter which initially determines the digital precision of the ramping function of the embodiment.

Signals from the counter 12 indicating the count or number N of pulses counted by the counter are provided by a plurality of connections generally at 14 to rate fraction setting input ports of a rate multiplier 16 of R bit capacity. Again, the rate multiplier may be an appropriately connected series of commercially available binary rate multiplier elements. The rate multiplier 16 also receives at an input port 18 a further train of pulses as from a clock oscillator (not shown). The rate multiplier multiplies the clock pulses by a fraction the numerator of which is the number N in the counter 12 and the denominator of which is a function of the bit capacity R of the rate multiplier. Output pulses from the rate multiplier then have a repetition rate expressed by:

$$f_{BRM} = f_c (N/2^R)$$

where $f_{BRM}$ is the repetition rate of pulses from the binary rate multiplier and $f_c$ is the repetition rate of pulses from the clock. The pulses from the binary rate multiplier are then provided through an OR gate 20 to a frequency divider 22.

The frequency divider 22 divides the frequency of pulses received from the rate multiplier by a constant M. The frequency divider may be one of several commercially available elements including a rate multiplier of rate fraction M or appropriately gated flip-flops where M will be a power of 2.

Figures 2, 3:
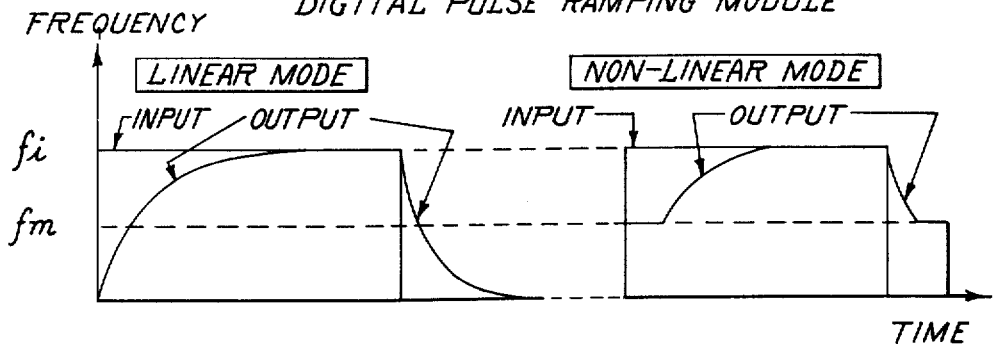
FIG. 2 is a graph of pulse rate v. time in one, linear mode of operation.
FIG. 3 is a graph of pulse form in another, non-linear mode of operation.

Pulses of reduced frequency from the frequency divider are provided to a frequency comparator and selector generally at 24 which compares the frequency of the pulses from the divider with the frequency of another train of pulses received from port 26. A signal at another port 28 selects a mode of operation for the frequency comparator. In one mode output pulses from the frequency comparator are at the input frequency and in linear proportion to the difference between desired and instantaneous pulse frequencies as shown in FIG. 2. In another mode, minimum frequency pulses are impressed on the output pulse rate as shown in FIG. 3. Output pulses from the frequency comparator are provided to additional circuitry, such as the exemplary stepping motor driver (not shown), and to a down counting port 30 on the counter 12. Since the rate multiplier 16 continues to provide output pulses so long as a non-zero count is maintained in the counter 12, every input pulse received by the counter at port 10 will ultimately have a corresponding output pulse received by the counter at port 30. One-to-one correspondence between the number of pulses in the input train and the output train is then maintained, the counter 12 ultimately reaching a zero count after a finite train of input pulses. A zero detector 32 in the counter 12 detects a zero count of the counter to positively disable further output from the circuit as with an appropriately connected AND gate (not shown) in the output line.

The counter 12 additionally functions as a device to prevent overload of the circuit from an excessive number of rapidly received input pulses. If initial input pulses received at the port 10 arrive at a frequency substantially in excess of the frequency of the clock pulses at port 18 and in a number in excess of the capacity of the counter, the counter 12 will fill to the capacity of the rate multiplier connections 14 before a substantial number of pulses arrive at the down counting port 30 to reduce the pulse count in the counter. The counter 12 will then overflow and the pulse count in the counter will no longer represent the number of pulses in the desired train received at port 10. The one-to-one correspondence between input and output pulse number will then be lost to inappropriately modify the train passing through the circuit. In a numerical control positioning system, such a result would lead to inappropriate positioning. To avoid this problem, the highest pulse count ports 34 of the counter 12 are bussed around the rate multiplier to the OR gate 20. The OR gate adds these pulses to those provided the frequency divider and hence to the output pulses received at the down-count port 30 of the counter 12. These additional pulses then reduce the count in the counter 12 to help maintain the pulse count in the counter within the capacity of the counter. In addition, bypassing the rate multiplier 16 provides all the additional counter pulses to the frequency divider rather than a number of pulses reduced by the rate fraction of the rate multiplier. The greater number of pulses thus carried to the output further helps maintain the count within the capacity of the counter 12.

In the preferred embodiment the OR gate 20 is positioned upstream of the frequency divider 22 to permit the divider to smooth the pulse train rendered more aperiodic by the addition of the overload pulses from the counter. However, in an alternative embodiment of the invention, the OR gate 20 may be positioned downstream of the frequency divider 22. When so located, every pulse received from the overload ports 34 of the counter will appear as an output pulse rather than a number of pulses divided by the constant of the frequency divider 22. If two or more output ports of the counter are then bussed to the OR gate 20, the counter is positively prevented from overload since the count in the counter 12 cannot then exceed the number of pulses received at 10 by more than the number of pulses entrained from the ports 34 to the down-count port 30. In absence of unnecessary delay means, the number of pulses so entrained should not exceed one; however, since the overload ports 34 were selected as the highest pulse count ports of the counter 12, the number of pulses which may be so entrained is determined by the capacity of the counter. In the illustrated embodiment, for example, the two lowest overload count ports 34 have an indicated pulse count difference of 212 to 213. However, in normal operation of the circuit, it is intended to have sufficient rate multiplier 16 capacity to receive rate fraction setting signals from the counter 12 for each input pulse at port 10. Such operation assures the normal, linear mode of circuit operation.

Mathematical confirmation of the above described operation of the circuit may be derived by initially recognizing that the instantaneous pulse count N in the counter 12 represents the difference between up-counting input pulses at frequency $f_i$ received at port 10 and down-counting output pulses at frequency $f_o$ received at port 30. This may be expressed by:

$$N = \int f_i dt - \int f_o dt. \tag{1}$$

The pulse frequency from the rate multiplier 16 is above expressed as:

$$f_{BRM} = f_c (N/2^R). \tag{2}$$

Similarly, the output pulse frequency $f_d$ from the frequency divider 22, assuming no pulse overload through the OR gate 20, is given by the rate multiplier frequency divided by the frequency divider constant M or:

$$f_d = f_{BRM}/M. \tag{3}$$

As is further explained below, the output pulse frequency from the frequency comparator 24 in the linear mode of operation is the same as the input pulse frequency. An output pulse frequency $f_o$ is then derived by solving equations (2) and (3) for N to obtain:

$$N = f_o (M2^R/f_c). \tag{4}$$

and substituting this value N into equation (1) and differentiating with respect to time t to obtain:

$$f_i = f_o + (M2^R/f_c) df_o/dt. \tag{5}$$

Expression (5) in Laplace notation and solved for the output pulse frequency $f_o$ is given by:

$$f_o = f_i [(f_c/M2^R)/s + (f_c/M2^R)], \tag{6}$$

the recognized solution for which is:

$$f_o = f_i(1 - e^{t/y}) \text{ where } y = M2^R/f_c. \tag{7}$$

A graph of this expression for the output pulse frequency is shown in FIG. 2.

Figure 4:
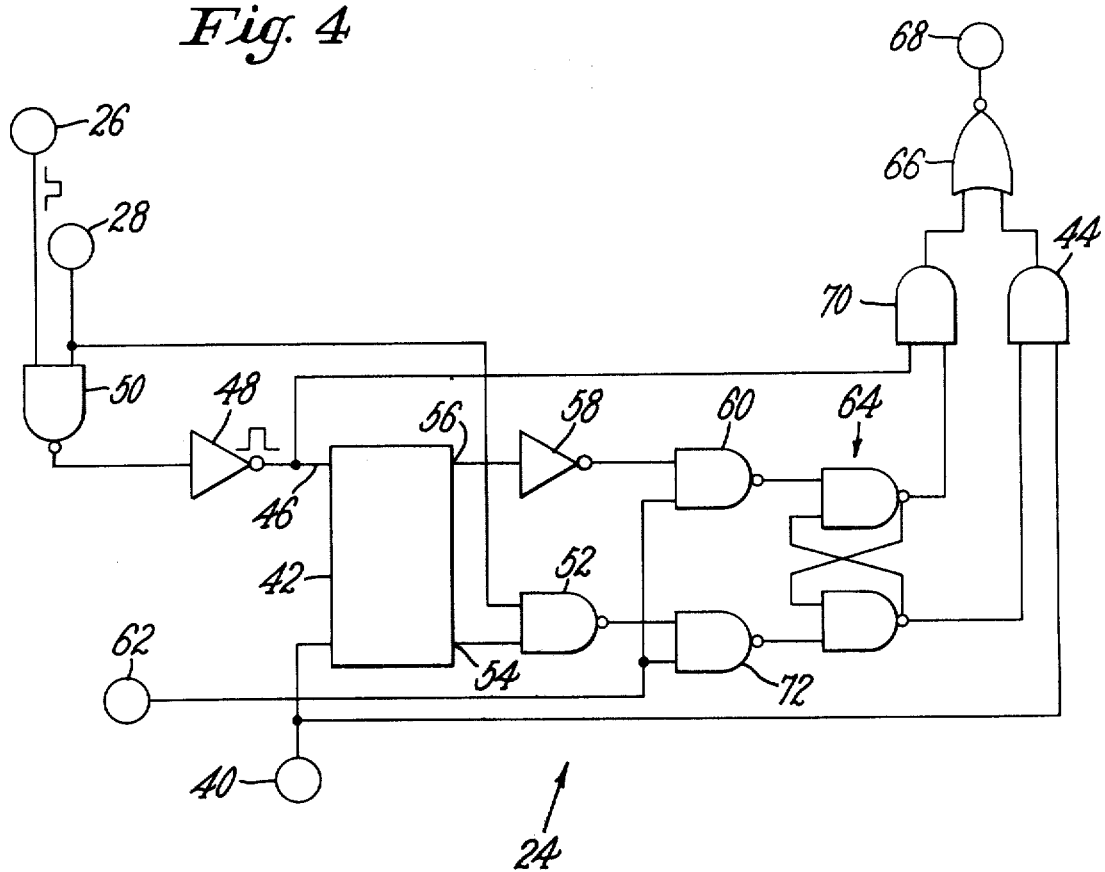
FIG. 4 shows circuit detail of a portion of the schematic shown in FIG. 1.

FIG. 4 shows detail of the construction of the frequency comparator generally at 24, each component device of which is commercially available. Pulses from the frequency divider 22 are received at an input port 40 connected to a phase-frequency detector 42 and an AND gate 44. The detector 42 has another input port 46 connected through an inverter 48 and AND gate 50 to input ports 26 and 28 receiving minimum frequency pulses and mode selection signals, respectively. A digital low signal on the mode selection port 28 disables the AND gate 50 to block the minimum frequency pulses and disables another AND gate 52 also connected to an output port 54 of the detector. The detector 42 then indentifies the only, higher frequency pulses received from port 40 to provide an output signal at port 56 which passes through connected inverter 58 to an AND gate 60. The AND gate 60 also receives appropriately timed synchronizing pulses from an input port 62. When the synchronizing pulses enable the gate 60, it provides a signal to an input port of a flip-flop generally at 64. The flip-flop then complements to provide an enabling signal to AND gate 44. The AND gate 44 is then enabled to pass the pulses from port 40 through an OR gate 66 to an output port 68 for use. The OR gate 66 is also connected to an AND gate 70 which, together with gate 44, is a recognizable OR gate expansion. The gate 70 is connected to flip-flop 64 and the input port 46 of the detector 42.

When a signal on the mode selection port 28 enables the AND gate 50 and 52, the minimum frequency pulses from port 26 are then applied to the port 46 and AND gate 70. The detector 42 then detects the higher of the input pulse frequencies at the port 46 or the port 40. If the frequency of pulses at port 40 is initially higher, the comparator functions as previously described. If, however, the minimum frequency pulses at the port 46 are of higher frequency, the detector provides a signal to output port 54 through gate 52 enabled by the signal from port 28 to a synchronizing AND gate 72. The gate 72, like the gate 60, is appropriately enabled by synchronizing pulses from port 62 to provide a signal to the flip-flop 64. The flip-flop then complements to enable the gate 70 and disable the gate 44 to pass the minimum frequency pulses through gates 70 and 66 to the output port 68. If the pulses at the port 40 should then achieve a higher frequency than the minimum frequency pulses, the detector 42 complements to provide a signal at port 56 which then complements the flip-flop 64 to provide the pulses from port 40 to the output ports 68 as before described. A graph of the latter function in terms of output pulse frequency is shown in FIG. 3.

Having thus described our invention, what we claim is:

1. A circuit for digitally supplying pulses to the motor driver of a stepping motor, said stepping motor responding to each pulse with a step as long as its acceleration capability is not exceeded, comprising:

a. A source of pulses;

b. A reversible counter connected to receive and count the pulses from the source;
c. A clock oscillator for supplying a train of pulses at a specific frequency;
d. A pulse rate multiplier connected to receive the clock pulse train and multiply the frequency of said pulse train by a factor directly proportional to the count accumulated in the reversible counter;
e. A frequency divider connected to receive the modified clock pulse train from the rate multiplier and divide it by a factor suitable to smooth the rate of the modified clock pulse train;
f. A pulse generator for supplying a train of pulses at a minimum rate;
g. A comparator connected to receive the pulses from the frequency divider and the minimum pulse rate generator and to pass whichever of said pulses has the higher rate; and
h. Means to apply the pulses passed by the comparator to the reversible counter to reduce the count therein.

* * * * *